United States Patent [19]

Sato

[11] 4,332,477
[45] Jun. 1, 1982

[54] FLATNESS MEASURING APPARATUS

[75] Inventor: Masatoshi Sato, Yokohama, Japan

[73] Assignee: Canon Kabushiki Kaisha, Tokyo, Japan

[21] Appl. No.: 215,341

[22] Filed: Dec. 11, 1980

Related U.S. Application Data

[63] Continuation of Ser. No. 107,939, Dec. 28, 1979, abandoned.

[30] Foreign Application Priority Data

Jan. 9, 1979 [JP] Japan ................................. 54-1959

[51] Int. Cl.³ ...................... G01B 11/30; G01B 11/24; G01C 25/00
[52] U.S. Cl. .................................. 356/371; 356/376; 364/571
[58] Field of Search ....................... 356/371, 376, 381; 364/571

[56] References Cited

U.S. PATENT DOCUMENTS 3,768,910 10/1973 Zanoni ................................. 356/375
3,857,637 12/1974 Obenreder ......................... 356/371
3,885,875 5/1975 Rosenfeld et al. .................. 356/371

FOREIGN PATENT DOCUMENTS 52-7764 1/1977 Japan ................................. 356/386

*Primary Examiner*—William H. Punter
*Attorney, Agent, or Firm*—Fitzpatrick, Cella, Harper & Scinto

[57] ABSTRACT

A flatness measuring apparatus or the like for measuring the flatness of a thin specimen such as a wafer for producing semi-conductor devices by detecting, with a photoreceptor, the first-order time-differentiated signal of the reflection angle of a laser scanning beam representing the surface configuration and electrically integrating said signal in time, said apparatus being featured in having a signal forming apparatus for providing, in case said thin specimen is inclined from a standard position, a correction signal corresponding to the amount of said inclination.

1 Claim, 11 Drawing Figures

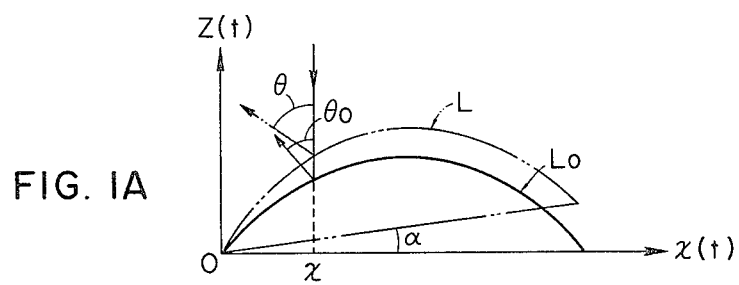
FIG. IA
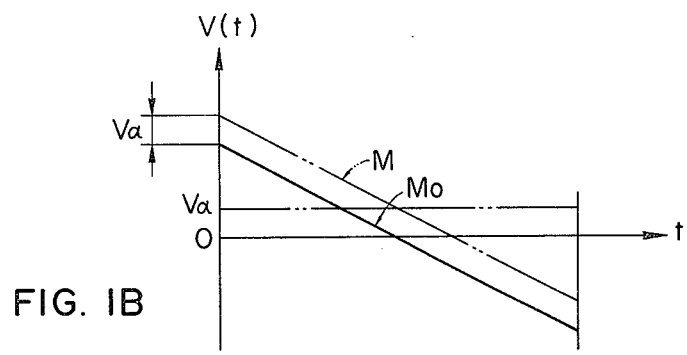
FIG. IB
FIG. 4A
FIG. 4B
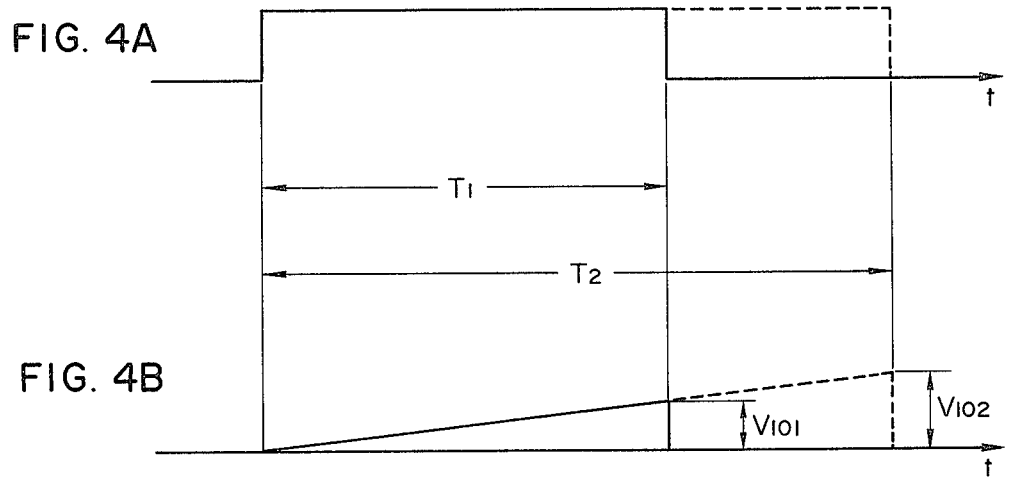

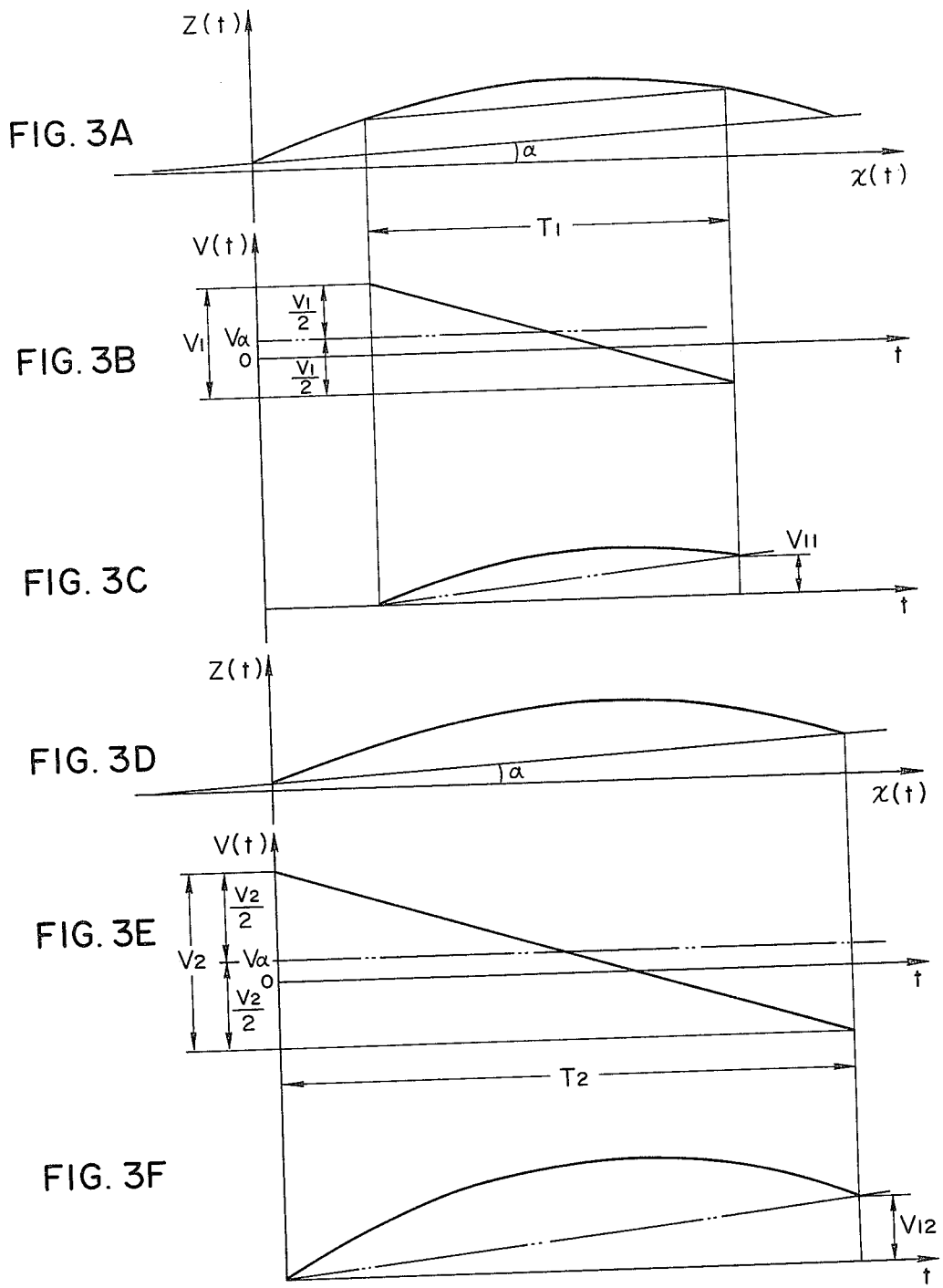

FLATNESS MEASURING APPARATUS

This is a continuation, of application Ser. No. 107,939, filed Dec. 28, 1979, now abandoned.

BACKGROUND OF THE INVENTION

1. Field of the Invention

The present invention relates to a signal forming apparatus, for example an apparatus for measuring the amount of bending of a thin specimen such as a wafer for producing semi-conductor devices, said apparatus being capable, in case the entire specimen is inclined, of providing a correction signal corresponding to the amount of said inclination.

2. Description of the Prior Art

There is already disclosed, for example in the U.S. Pat. No. 3,885,875 and in the Japanese Patent Laid-Open Sho53-91772, an apparatus for measuring the flatness of a tested surface by scanning said surface with a laser beam put into a scanning motion by means of a polygonal mirror, continuously detecting the reflection angle of the normally reflected light with a position detector and electrically integrating the detection signal.

In case the tested surface of the specimen has a small inclination angle, it is more advantageous, in view of the work efficiency, to correct the measured values by a correction signal corresponding to the amount of said inclination than to adjust the specimen exactly to the desired standard position.

The amount of such inclination is constant regardless of the measuring time which is related to the width of measurement on the tested surface, and such correction signals should therefore be constant regardless of said width of measurement.

This requirement has conventionally been met by modifying, in response to the measuring time, the integration constant of an integrating circuit for generating said correction signal, thus to obtain a correction signal corresponding to the amount of inclination and not affected by the measuring time related to the width of measurement.

However the changeover of the integration constant corresponding to the above-mentioned width of measurement, which has been conducted manually with a selector switch and a variable resistor provided on the panel of the apparatus, is difficult to achieve exactly and may easily lead to an erroneous measurement resulting from an erroneous setting of said constant. Also such change-over of the integration constant requires additional components in the electronic circuitry, thus leading to an additional time required for the assembly and adjustment.

SUMMARY OF THE INVENTION

The object of the present invention, therefore, is to easily obtain, for example in a flatness measuring apparatus and the like, a correction signal corresponding to the inclination of the entire tested surface without the necessity for manual setting or changeover of the integration constant and not influenced by the change in the measuring time related to the width of measurement. According to the present invention, the above-mentioned object can be achieved by a structure comprising time-axis forming means for generating a signal proportional to the time period of measurement corresponding to the width of measurement of the tested specimen on a predetermined coordinate axis, inclination signal generating means for generating a signal corresponding to the inclination of the tested specimen with respect to a standard position thereof, and ratio calculating means for providing the ratio between the signal obtained from said inclination signal generation means and the signal obtained from said time-axis signal forming means.

BRIEF DESCRIPTION OF THE DRAWINGS

FIGS. 1A and 1B are optical explanatory views of a flatness measuring apparatus embodying the present invention;

FIGS. 3A, 3B and 3C are charts respectively showing the tested surface, output of the photodetector and the integrated output in a measuring time;

FIGS. 3D, 3E and 3F are charts respectively showing the tested surface, output of the photodetector and the integrated output in another measuring time; and FIGS. 4A and 4B is a chart showing the output of the time-axis generator and the integrated output thereof.

DESCRIPTION OF THE PREFERRED EMBODIMENTS

Figure 2:
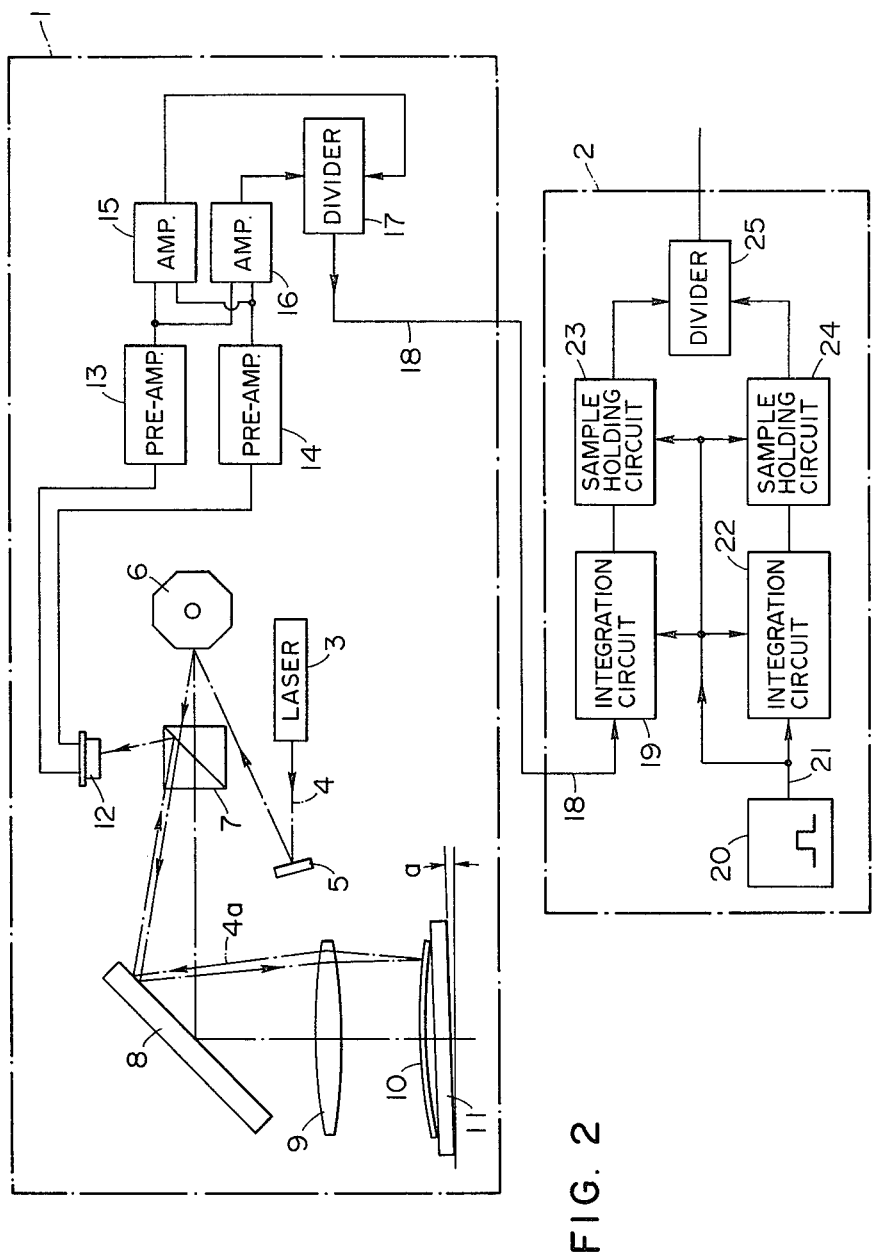
FIG. 2 is an explanatory view of the flatness measuring apparatus embodying the present invention.

In FIG. 1A, $L_o$ represents the cross-sectional configuration of a tested surface in the standard position, and L represents the same cross-sectional configuration inclined entirely by an angle $\alpha$. The configuration L is represented by a function $Z(t)$ of the scanning time t, while the incident beam position corresponding to said scanning time t is represented by a function $x(t)$.

Assuming that the normal reflection angles for an incident beam of a determined angle corresponding to the configurations $L_o$ and L are respectively $\theta_o$ and $\theta$, there stand the following approximations in case said angles are satisfactorily small, i.e. in case the angulation of the tested surface is satisfactorily small:

$\theta_o = 2 \cdot dz(t)/dx(t)$ $\theta = \theta_o + 2\alpha$

Thus an entire inclination of the tested surface by an angle $\alpha$ causes a change in the reflection angle by $2\alpha$.

FIG. 1B shows the analog output $V(t)$ from the position detector as a function of time t, wherein the curves $M_o$ and M respectively representing the analog outputs corresponding to the configurations $L_o$ and L. As said output from the position detector is proportional to the reflection angle, an inclination of the entire tested surface by an angle $\alpha$ results in an overall shift of said analog output $V(t)$ by an amount $V\alpha$ which is proportional to $\alpha$.

Thus it is necessary to inversely shift the analog output $V(t)$ by an amount $V\alpha$ in order to compensate the inclination of the tested surface.

As the amount of inclination is constant regardless of the measuring time related to the width of measurement, the correction signal for compensating the inclination should remain constant also regardless of the measuring time related to the width of measurement.

For this reason there has conventionally been required a cumbersome initial adjustment of selecting the integration constant according to the measuring time.

However said initial adjustment of the integration constant is eliminated in the present invention in which a correction signal corresponding to the amount of inclination is derived from a fact that there is maintained a constant ratio, regardless of the measuring time, between a sample-hold output at the end of the measuring time obtained by integration of the square-wave signal of the time-axis generator during said measuring time corresponding to the width of measurement and a sample-hold signal at the end of said measuring time obtained by similar integration of the analog output including the inclination angle component during said measuring time.

In the following there will be given an explanation on a flatness measuring apparatus embodying the present invention while making reference to FIG. 2, in which there are shown an analog signal generator 1 for generating analog signal including the inclination angle component, and a correction signal generator 2. In the above-mentioned apparatus the measurement of flatness is achieved by two successive scannings of a tested surface, wherein the first scanning provides an analog output signal including the inclination angle component, while the second scanning provides an analog output signal not containing said inclination angle component, by means of a correction signal. Now following the optical path in said apparatus, a gas laser 3 emits a laser beam 4 which is reflected by a mirror 5 and then by a polygonal mirror 6 rotated at a constant speed, and further guided through a polarizing beam splitter 7, a mirror 8 and a lens 9 to a tested specimen 10. 11 is a stage for supporting said tested specimen 10, and a represents a small inclination of said tested specimen 10 to the horizontal plane.

The laser beam 4a reflected by the tested specimen 10 and containing the inclination component is guided again through the lens 9 and the mirror 8 to said polarizing beam splitter 7, where it is totally reflected and focused on a position detector 12.

Said position detector 12 provides two output signals which are mutually equal when said laser beam 4a is focused on a zero point, whilst in case said focused point is displaced from said zero point to one side the output signal of said side increases in proportion to the amount of said displacement and the other output signal decreases in the same proportion.

Said two output signals are supplied to respective pre-amplifiers 13, 14 and then to a summing amplifier 15 and a differential amplifier 16, whereupon the output of said summing amplifier 15 is supplied as a denominator input to an analog divider 17 while the output of said differential amplifier 16 is supplied as a numerator input to said analog divider 17, which thus provides an analog signal 18 containing the inclination component.

Said analog signal is supplied to a first integrating circuit 19 of the correction signal generating device 2.

In synchronization with said analog signal 18 a time-axis generator 20 generates square-wave signal 21 proportional to the width of measurement at regular intervals, said signal 21 being utilized as the input signal to a second integrating circuit 22 and also as the timing signal for the first and second integrating circuits 19, 20 and the first and second sample-hold circuits 23, 24. The outputs from said first and second sample-hold circuits 23, 24 are supplied respectively as the numerator input and the denominator input to a second analog divider 25, which thus provides an output signal of a constant level regardless of the measuring time.

For the purpose of further clarifying the present invention, there will be given an explanation on the analog signals 18 and the outputs of the first integrating circuit 19 relating to a same tested surface with the same inclination but corresponding to two different measuring times, while making reference to FIG. 3.

FIGS. 3A, 3B and 3C respectively show the tested surface configuration, photodetector output and integrated output corresponding to a measuring time T1, while FIGS. 3D, 3E and 3F respectively show those corresponding to another measuring time T2.

As shown in FIG. 3B, the position detector continuously provides an analog output during the measuring time T1 corresponding to the configuration of the tested surface, with a voltage difference V1 between the beginning and the end of said measuring time. If the configuration of the tested surface is symmetrical in the lateral direction, said analog output becomes also symmetrical around a value $V\alpha$ which is proportional to the amount of inclination.

Said analog signal is integrated by the first integrating circuit 19 during the measuring time T1 as shown in FIG. 3C, and the integrated output V11 is maintained in the first sample hold circuit.

In case of FIG. 3E, the analog signal is similarly obtained during the measuring time T2 corresponding to the configuration of the tested surface, with a voltage difference V2 between the beginning and the end of said measuring time. Since the overall inclination is assumed to be the same in both cases, the amount of shift $V\alpha$ of said analog signal corresponding to said inclination $\alpha$ is the same as that in the foregoing case. The analog signal thus obtained is integrated by the first integrating circuit 19 during the measuring time T2 as shown in FIG. 3F, and the integrated output V12 is stored in the first sample hold circuit. There stands the following relationship:

$$V12/V11 = T2/T1$$

On the other hand, as shown in FIG. 4A, the square-wave signal from the time-axis generator is integrated by the second integrating circuit during the measuring time T1 or T2 to provide a voltage V101 or V102 proportional, as shown in FIG. 4B, to said measuring time, wherein:

$$V102/V101 = T2/T1$$

Said voltage is stored in the second sample hold circuit 24.

From these relations there stands:

$$V11/V101 = V12/V102 = K(\text{constant})$$

so that the analog divider 25 provides a constant output not affected by the measuring time t, and in this manner it is rendered possible to obtain a correction signal which is proportional to the inclination of the tested surface and which is not affected by the measuring time related to the width of measurement.

In general, in case of a measurement of a part of a curved surface, the change in the width of measurement results in a change in the inclination of a line connecting the start point and the end point of the measurement. However, if a constant correction signal not affected by the measuring time can be initially obtained corresponding to the inclination of the entire surface, it is possible to conduct the measurement of flatness satisfactorily as a constant correction signal can be obtained also for other inclinations regardless of the measuring time.

As explained in the foregoing, the present invention makes it possible to obtain a constant signal corresponding to the inclination of the tested specimen without the effect of the change in the width of measurement and also without the manual setting or changeover of the integration constant as required conventionally, and the above-mentioned advantage can be obtained with a simple apparatus allowing easy assembly and adjustment.

What I claim is:

1. A flatness measuring apparatus, comprising:

a scanning optical system for scanning a tested surface with a constant incident angle;

a position detector for detecting the normal reflection angle from said tested surface;

time-axis generating means for generating a square-wave output during a measuring time corresponding to the width of measurement;

inclination signal generating means for generating a signal corresponding to the inclination of said tested surface with respect to a standard position thereof, and ratio calculating means for providing a ratio between the signal from said inclination signal generating means and a signal obtained by electrically integrating, with respect to time, the signal provided by said time-axis generating means.

* * * * *

UNITED STATES PATENT AND TRADEMARK OFFICE
CERTIFICATE OF CORRECTION

PATENT NO. : 4,332,477
DATED : June 1, 1982
INVENTOR(S) : MASATOSHI SATO

It is certified that error appears in the above—identified patent and that said Letters Patent is hereby corrected as shown below:

Column 2

Line 6, change "generation" to --generating--.

Line 39, change "2.dz" to --2·dz--.

Column 3

Line 26, change "a" to --$\underline{a}$--.

Signed and Sealed this

Twelfth Day of October 1982

[SEAL]

Attest:

GERALD J. MOSSINGHOFF

Attesting Officer     Commissioner of Patents and Trademarks